United States Patent [19]
Dieringer

[11] 3,942,000
[45] *Mar. 2, 1976

[54] METHOD AND APPARATUS FOR POSITIONING RAILWAY MACHINES

[75] Inventor: Andrew M. Dieringer, Waterford, Wis.

[73] Assignee: Rexnord, Inc., Milwaukee, Wis.

[ * ] Notice: The portion of the term of this patent subsequent to July 17, 1990, has been disclaimed.

[22] Filed: Jan. 21, 1974

[21] Appl. No.: 435,155

[52] U.S. Cl. ............................ 250/222 R; 104/17 R
[51] Int. Cl.² ..................................... G01D 21/04
[58] Field of Search ............... 104/7, 17 R; 356/172; 180/98; 250/222, 223

[56] References Cited
UNITED STATES PATENTS

| | | | |
|---|---|---|---|
| 3,593,863 | 7/1971 | Kintner | 250/222 |
| 3,671,753 | 6/1972 | Lucas | 250/222 |
| 3,672,470 | 6/1972 | Ohntrup | 250/222 |
| 3,681,607 | 8/1972 | Hartman | 250/222 |
| 3,745,930 | 7/1973 | Dieringer | 104/17 |
| 3,753,405 | 8/1973 | Bryan | 104/17 |

Primary Examiner—Archie R. Borchelt
Assistant Examiner—D. C. Nelms
Attorney, Agent, or Firm—Kinzer, Plyer, Dorn & McEachran

[57] ABSTRACT

This is concerned with a method and apparatus for sensing and/or finding objects along railway track, for example a tie, so that work may be done in relation thereto. More specifically, the subject matter is concerned with a method and apparatus for finding ties on a step-by-step basis and performing work in relation thereto, for example tamping between the ties or driving spikes through the holes in tie plates into the ties, or the like.

3 Claims, 4 Drawing Figures

METHOD AND APPARATUS FOR POSITIONING RAILWAY MACHINES

SUMMARY OF THE INVENTION

This invention is concerned with a railroad track method and apparatus for performing work along railroad track and is specifically concerned with an accurate tie-sensing method and apparatus which may be used to sense the location of ties so that work may be done by maintenance equipment between or in relation to the ties, for example tamping the ballast, for driving spikes, etc.

A primary object of the invention is a method and apparatus of locating or finding railroad ties in railroad track.

Another object is a method and apparatus of the above type which may be done without any physical contact with the ties.

Another object is a method and apparatus of the above type which does not require subsequent recalibration to compensate for wear.

Another object is a method and apparatus of the above type which does not require or depend upon any physical contact with the ties.

Other objects will appear from time to time during the ensuing specification and drawings.

DESCRIPTION OF THE PREFERRED EMBODIMENT

Figure 1:
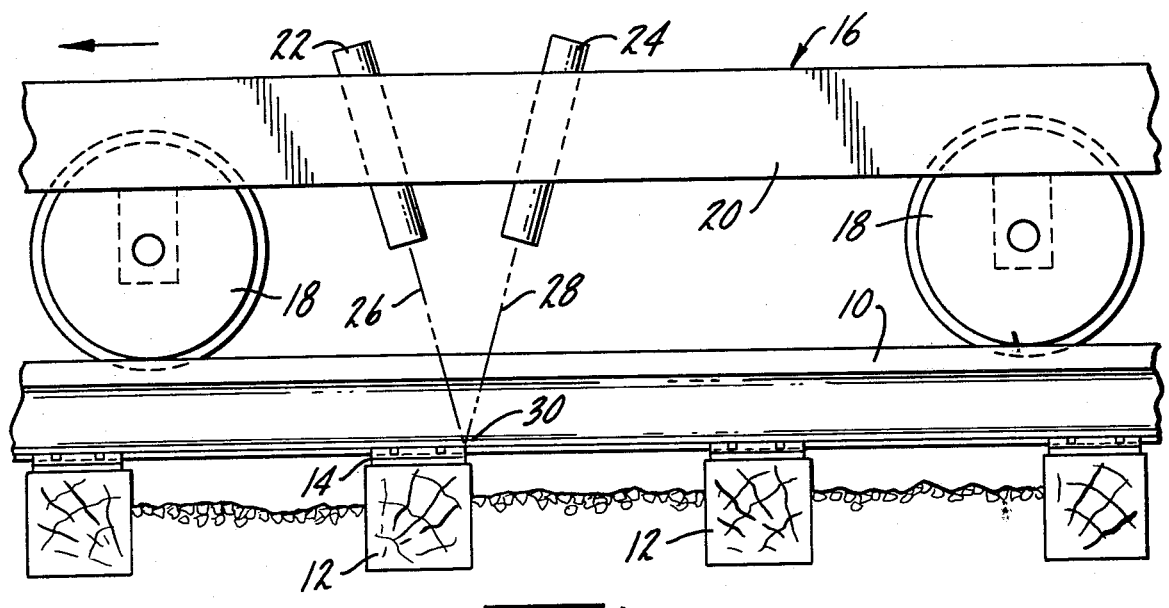
FIG. 1 is a side view of a schematic form of the invention.

In FIG. 1 a railroad track is shown which includes rails 10 positioned on ties 12 at suitably spaced intervals with a tie plate 14 on top of the ties and under the rails. Any suitable track-working machine is diagrammatically indicated at 16 and includes wheels 18 supporting a frame 20 for movement along the track. The details of the machine, be it a spike-driver, a tamper or what-have-you, self-propelled or otherwise, are not important.

Positioned on the machine is a tie finding device which includes a laser beam projector 22 and an optical receiver 24 which are disposed at a suitable angle to the vertical so that their projected lines or axes 26 and 28 intersect at a certain point 30. It will be noted that the laser beam 26 is at a certain angle to the vertical in FIG. 1, as is the optical receiving line 28 with the bisect of their angle to each other being a vertical.

In any event, their projections or lines 26 and 28 intersect to a certain point and whenever a reflective surface is in the plane of the intersection point 30, the receiver 24 will see a laser beam spot, otherwise not.

Figure 2:
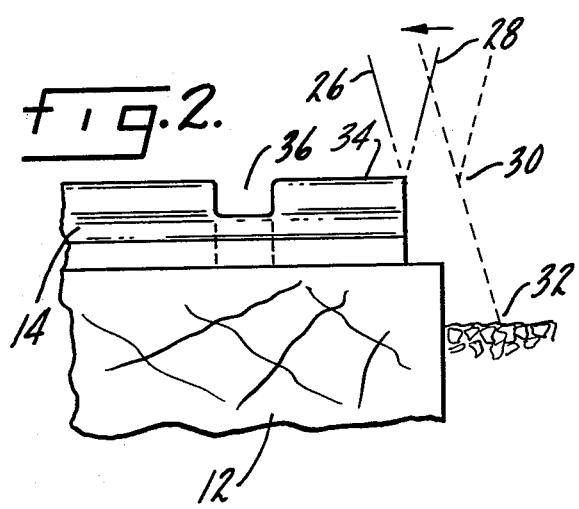
FIG. 2 is an enlargement of a portion of FIG. 1.

For example, the laser beam 26 in FIG. 2 is shown diagrammatically, as is the receiving line 28, with the assumption that the machine is moving from right to left, as indicated by the arrow. When the lines are in the crib space between ties, the spot of the laser beam will strike the stones or ballast at some point 32 well below the intersection plane or point 30 and the receiver 24 will not "see" the laser beam spot or reflection. But as soon as the machine moves to the left somewhat so that the intersection point 30 coincides with the upper surface 34 of the tie plate, the receiver 24 will receive a signal since it will "see" the laser beam spot. The thus received signal may be used to stop machine travel and initiate some sort of a work cycle, such as driving a spike or lowering tamping heads.

The device in a sense "feels" the edge of the tie plate with no signal being received as long as the laser beam is directed at the ballast. In a sense the device is a height gauge since it is programmed to the distance from the top of the rails to the top of the tie plates. And whenever the laser beam projector and its receiver senses this distance as caused by the beam striking the top of the tie plate at the edge thereof so that the receiver receives a signal, a certain action or program can be initiated therefrom. But if the sensing device is directed to an area where any reflective surface is too low, such as the ballast in the crib, or possibly too high, the receiver will not receive a signal. In a particular type of railroad track the distance from the top of the rail to the top of the tie plates is quite accurate and does not vary. In a sense this distance is defined by the steel of the rail and tie plate which will be within manufacturing tolerances and is completely independent of the condition of the wooden ties themselves, be they new or old and plate-cut or otherwise. Nor will it depend upon the condition of the right-of-way, i.e. whether the track has been recently tamped and surfaced or is old and needs maintenance. But the point is that the distance is accurate and can be relied upon.

Figure 3:
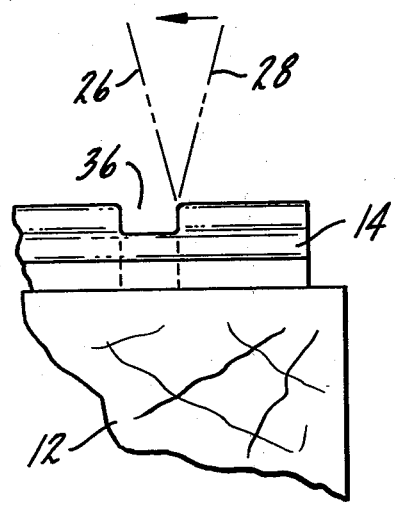
FIG. 3 is similar to FIG. 2 but of a different position.

Whereas in FIG. 2 the device is shown as used as a tie finder, it can also be used as a hole finder to find the hole in the tie plate where the spike is to be driven. For example, in FIG. 3, the device and machine may be assumed to have moved to the left somewhat from the FIG. 2 position so that the laser beam reflection spot has moved along the surface of the top of the tie plate with the receiver 24 receiving a signal. But as soon as the point of intersection 30 moves into a tie plate hole, as at 36 in FIG. 3, a signal will no longer be received and a different sequence of operation may be initiated therefrom. For example, the machine may stop and a spike-driving procedure automatically initiated.

Figure 4:
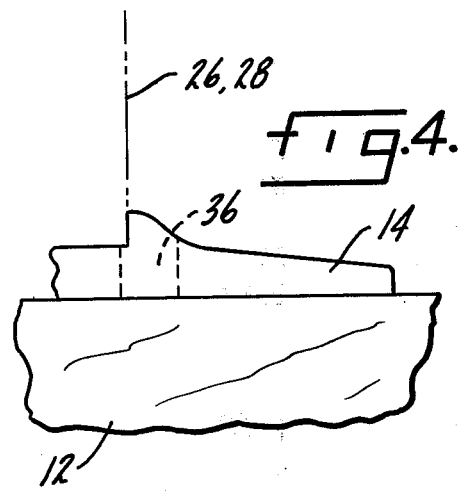
FIG. 4 is an end view of either FIG. 2 or FIG. 3 or both.

The plane defined by the two intersecting lines 26 and 28 may be vertical as in FIG. 4, or it may be inclined in a longitudinal direction if the reflective surface is inclined without affecting the accuracy or operability of the device.

The use, operation and function of the invention are as follows:

In a broad sense, the invention is concerned with a height gauge to detect the upper surface of tie plates on railroad track so that track maintenance equipment may be accurately positioned relative thereto for doing work along the track. The device and method have the advantage that there is no physical contact between the tie plates and the equipment and therefore nothing to wear. The signal generated by the invention may be used to propel the machine, stop it, initiate or terminate a work cycle, or what-have-you.

Finding ties and accurately positioning railway maintenance equipment relative thereto has been a nagging problem for years and is frequently done by a finger-type element, in the nature of a metal depending rod, which drags along the track and physically feels for the ties. But the present arrangement merely relies upon the presence or absence of the laser beam reflected spot which will only occur or will disappear at a certain level which, in the case of either finding the edge of a tie plate or the hole therein, is quite accurate since the distance, in effect, is from the top of the rail down to the upper surface of the tie plate and is therefore not subject to much variation, if any.

While a preferred form of the invention has been shown and described, with several variations thereof, it should be understood that suitable additional modifications, changes, substitutions and alterations may be made without departing from the invention's fundamental theme.

The embodiments of the invention in which an exclusive property or privilege is claimed are defined as follows:

1. A method of positioning a track-working machine on a railroad track, including the steps of measuring the distance from the top of a rail to the top of a tie plate, electro-optically sensing the distance downwardly from the top of the rails, moving the machine along the track, and stopping the machine when the sensed distance equals the measured distance.

2. A method of positioning a track working instrument on a railroad track relative to a tie, including the steps of mounting a laser beam source and a sensor on the instrument, disposing the axes of the source and sensor downwardly and at an angle to each other, intersecting their axes in the plane of the top of the tie plates on the ties, generating a signal from the sensor indicative of when the sensor detects a spot from the laser beam on the top of the tie plates, moving the instrument as well as the laser beam source and sensor in a scanning motion along the track, changing the thus generated signal from the sensor when the intersection point of their axes arrives at a spike hole so that the laser beam does not reflect at the point of intersection, and immediately driving a spike in response to the change in the thus generated signal.

3. A method of positioning a track working machine on a railroad track relative to a tie, including the steps of directing a laser beam downwardly at an angle to the vertical from a position on the machine so that as the machine moves along the track, the laser beam will impinge upon the tops of the ties, directing a sensor downwardly from a position on the machine along an axis that intersects the laser beam in the plane at the top of the ties, moving the machine along the track, and stopping the machine when the sensor detects the laser beam reflected from the top of a tie.

* * * * *